(12) United States Patent
Kurita et al.

(10) Patent No.: US 6,733,162 B2
(45) Date of Patent: May 11, 2004

(54) LAMP PIECE FOR VEHICLE (75) Inventors: Takashi Kurita, Shizuoka (JP); Katsuhiko Iiyama, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/194,796

(22) Filed: Jul. 12, 2002

(65) Prior Publication Data

US 2003/0012031 A1 Jan. 16, 2003

(30) Foreign Application Priority Data

Jul. 13, 2001 (JP) .................................. P. 2001-213296

(51) Int. Cl.[7] .......................... F21V 19/02; F21V 21/14
(52) U.S. Cl. ..................... 362/524; 362/515; 362/421; 362/487; 362/507; 362/512; 362/528; 362/529; 362/287
(58) Field of Search ................. 362/524, 515, 362/514, 421, 478, 485, 487, 507, 512, 528, 529, 287

(56) References Cited

U.S. PATENT DOCUMENTS

| | | | |
|---|---|---|---|
| 4,845,598 A | * 7/1989 | Watanabe et al. | ............. 362/61 |
| 5,647,659 A | * 7/1997 | Mori | ............. 362/66 |
| 5,678,915 A | 10/1997 | Shirai et al. | |
| 6,017,137 A | 1/2000 | Suehiro et al. | |
| 6,481,879 B1 | * 11/2002 | Shirai et al. | ................. 362/514 |

* cited by examiner

Primary Examiner—Sandra O'Shea
Assistant Examiner—Sharon Payne
(74) Attorney, Agent, or Firm—Fish & Richardson P.C.

(57) ABSTRACT

A vehicle lamp. A lamp chamber is partitioned by a lamp body in a vessel-like shape and by a front face lens, a reflector is attachedly inserted with a light source and is contained in the lamp chamber, and an aiming mechanism is interposed between the lamp body and the reflector for supporting the reflector inclinably to the lamp body. The reflector is inclined by rotating an aiming screw supported by a screw inserting hole provided at the lamp body. A rear end portion of the aiming screw projects to the rear side of the lamp body and includes an integrated crown gear made of a metal. A disk face of the gear is provided with a raised wrench engaging portion for engaging with an L-shaped wrench to thereby operate to rotate the aiming screw by using the L-shaped wrench extending from the side of the lamp piece. Aiming screw adjustments can be carried out even when there is no rear space behind the lamp piece. The wrench engaging portion can be formed simply.

11 Claims, 7 Drawing Sheets

LAMP PIECE FOR VEHICLE

BACKGROUND OF THE INVENTION

1. Field of the Invention

The present invention relates to a vehicle lamp of a movable reflector type in which a reflector attachedly inserted with a light source is inclinably supported by an aiming mechanism to a lamp body, and the reflector is inclined by rotating an aiming screw supported by the lamp body. In particular, a vehicle lamp of a movable reflector type in which a rear end portion of an aiming screw projects to a rear side of a lamp body has an integrated gear in a shape of a circular disk rotatable by a driver.

2. Description of the Related Art

Figure 8:
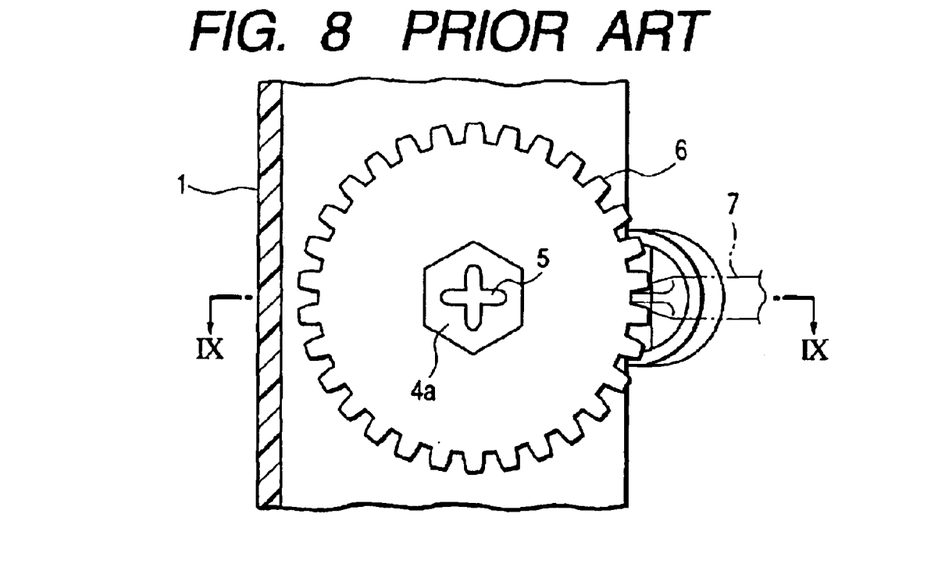
FIG. 8 is an enlarged horizontal sectional view of a rotation supporting portion of an aiming screw according to a conventional vehicle lamp.
Figure 9:
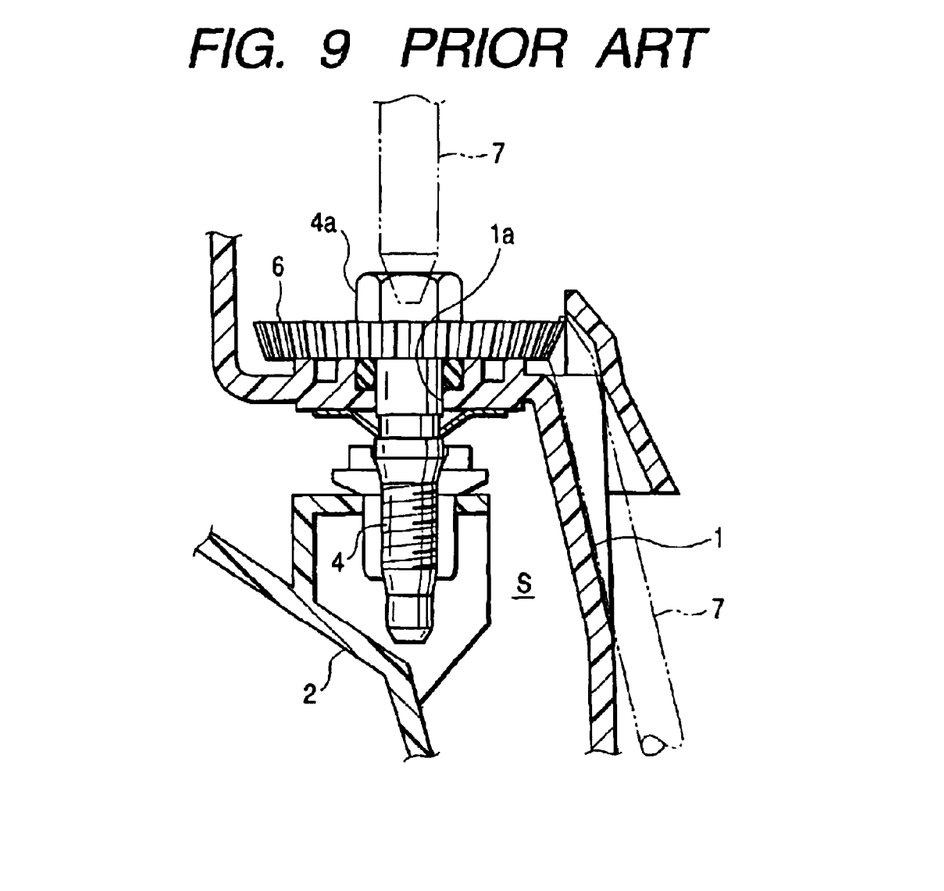
FIG. 9 is an enlarged vertical sectional view of a periphery of the rotation supporting portion of the aiming screw of FIG. 8.

FIGS. 8 and 9 illustrate a conventional vehicle lamp. An inside portion of a lamp chamber S is partitioned by a vessel-like lamp body 1 and a front face lens (not shown), and a reflector 2 has an attached light source (not shown) inclinably supported by an aiming mechanism. The reflector 2 (optical axis of lamp piece) is inclined by pivoting an aiming screw rotatably supported by a screw inserting hole 1a provided in the lamp body 1.

A rear end portion 4a of the aiming screw 4 projects to a rear side of the lamp body 1 and is integrated with a gear 6 having a circular disk shape. The aiming screw 4 is pivoted by bringing a tooth tip of a screw driver 7 to mesh with the tooth of the gear 6 and turning the driver 7. In addition, the screw at the rear end portion 4a of the aiming screw, includes a cross groove 5 and when the optical axis is intended to incline by a large amount, the tooth tip of the driver 7 is fitted to the cross groove 5 and the aiming screw 4 is rotated by turning the driver 7.

However, according to the above-described conventional technology, it is necessary to form the cross groove 5 for fitting the driver at the rear end portion 4a of the aiming screw. However, fabrication of the cross groove 5 is troublesome and further, the screw rear end portion 4a becomes large-sized for forming the cross groove 5, so that the weight of the aiming screw is increased by that amount, and consequently the weight of the lamp piece is increased.

Further, in order to fit the tooth tip of the driver 7 to the cross groove 5, the driver 7 needs to operate from the rear side of the lamp piece (right behind the screw rear end portion 4a). However, the driver 7 cannot be operated when there is no rear space between a vehicle body and the lamp piece.

SUMMARY OF THE INVENTION

The invention has been carried out in view of the problem of the conventional technology and provided is a vehicle lamp capable of operating to rotate an aiming screw by a large amount from a direction other than a rear direction of the lamp piece.

A vehicle lamp is disclosed having a lamp chamber partitioned by a lamp body in a vessel-like shape and a front face lens, a reflector attachedly inserted with a light source and contained in the lamp chamber, and an aiming mechanism interposed between the lamp body and the reflector for supporting the reflector inclinably to the lamp body. The reflector is inclined by rotating an aiming screw supported by a screw inserting hole provided in the lamp body, and an end portion of the aiming screw projects to a rear side of the lamp body and includes an integrated gear in a shape of a circular disk made of a metal to be proximate to the lamp body. A disk face of the gear is provided with a raised wrench engaging portion for engaging with an L-shaped wrench.

When the L-shaped wrench is arranged in a direction substantially orthogonal to the aiming screw direction and is engaged with the wrench engaging portion and the L-shaped wrench is turned, the wrench engaging portion is turned integrally therewith. That is, the aiming screw can be operated to rotate by turning the L-shaped wrench.

The wrench engaging portion can be formed simply by forming a cut in, for example, a U-like shape at a disk portion of the gear and raising an area in a shape of a tongue piece surrounded by the cut. Thus, a step of making a large-sized rear end portion of the aiming screw and fabricating a cross groove at the portion is avoided.

Further, by cutting and raising a portion of the disk portion, the disk portion is formed with an opening portion in correspondence with the wrench engaging portion. Therefore, the gear is light-weight in comparison to the conventional structure or a structure of fixedly integrating the wrench engaging portion formed separately to the gear.

A further feature may include a wrench engaging portion constituted by three pieces of erected walls in a shape of a tongue piece at equal intervals in a peripheral direction, raised toward a center side of the gear to be brought in mesh with three faces of an inner periphery at equal intervals of a hexagonal engaging hole of the wrench. Three faces of the hexagonal engaging hole of the wrench at equal intervals at the inner periphery are engaged with the erected walls in the shape of a tongue piece, the wrench engaging portion and the hexagonal engaging hole of the wrench are prevented from being turned in the peripheral direction and by turning the wrench, the gear (aiming screw) can firmly be integrally rotated.

By raising an area surrounded by a cut in, for example, a U-like shape of the gear disk portion to the center side of the gear, the erected wall in the shape of the tongue piece can simply be formed. Further, the compact wrench engaging portion can be constituted by three pieces of the erected walls in the shape of the tongue piece and therefore, the constitution of the wrench engaging portion is concise.

There also may be constructed a constitution in which the gear is constituted by a crown gear, a teeth portion of which is inclined to a disk face thereof by a predetermined angle. The lamp body may be provided with a first driver guide for holding a driver in a state of bringing a tooth tip of the driver in mesh with the teeth portion of the crown gear. Further, as shown by the embodiment, the first driver guide is constituted by, for example, a circular hole formed at an extended portion of a metal sheet formed member interposed between a crown gear and a peripheral edge portion of a screw inserting hole.

When inclination of the gear portion of the crown gear relative to the disk face is constituted by an angle near to a right angle, the crown gear can be pivoted by using the aiming screw inserted from a side of the lamp piece. Further, when the inclination is made to fall in a range of 0° through 90 degrees, by constituting the inclination of the teeth portion of the crown gear relative to the disk face by a predetermined value such that the crown gear can be pivoted by using the aiming screw inserted from a skewed front direction of a side of the lamp piece, and making a position of providing the driver guide and a mode of holding the driver pertinent, the aiming screw can be pivoted by using the driver arranged from the predetermined direction.

Further, the tooth tip of the driver is maintained in a state of being brought in mesh with the tooth portion of the crown gear by the first driver guide and therefore, the aiming screw is pivoted firmly in cooperation with pivotal movement of the driver.

Further, there may be constructed a constitution in which the lamp body is provided with a second driver guide for leading the tooth tip of the driver in a direction of being brought into mesh with the teeth portion of the crown gear. Further, the second driver guide may be constituted by, for example, a pair of upper and lower plate-like extended portions provided at an inclined face of a corner portion of a side face of a rear face wall of the lamp body. When the tooth tip of the driver is inserted along the second driver guide, the tooth tip of the driver is brought in mesh with the teeth portion of the crown gear and at the same time, the vicinity of the tooth tip of the driver is brought into contact with the first driver guide and a state of bringing the tooth tip of the driver and the teeth portion of the crown gear in mesh with each other is maintained. That is, the second driver guide is operated as a guide for inserting to guide the driver, and the first driver guide is operated as a meshing maintaining guide for maintaining the state of bringing the tooth tip of the driver and the teeth portion of the crown gear in mesh with each other and therefore, operation of pivoting the aiming screw by the driver becomes smooth.

DETAILED DESCRIPTION

An explanation will be given of a mode for carrying out the invention based on embodiments as follows.

Figure 1:
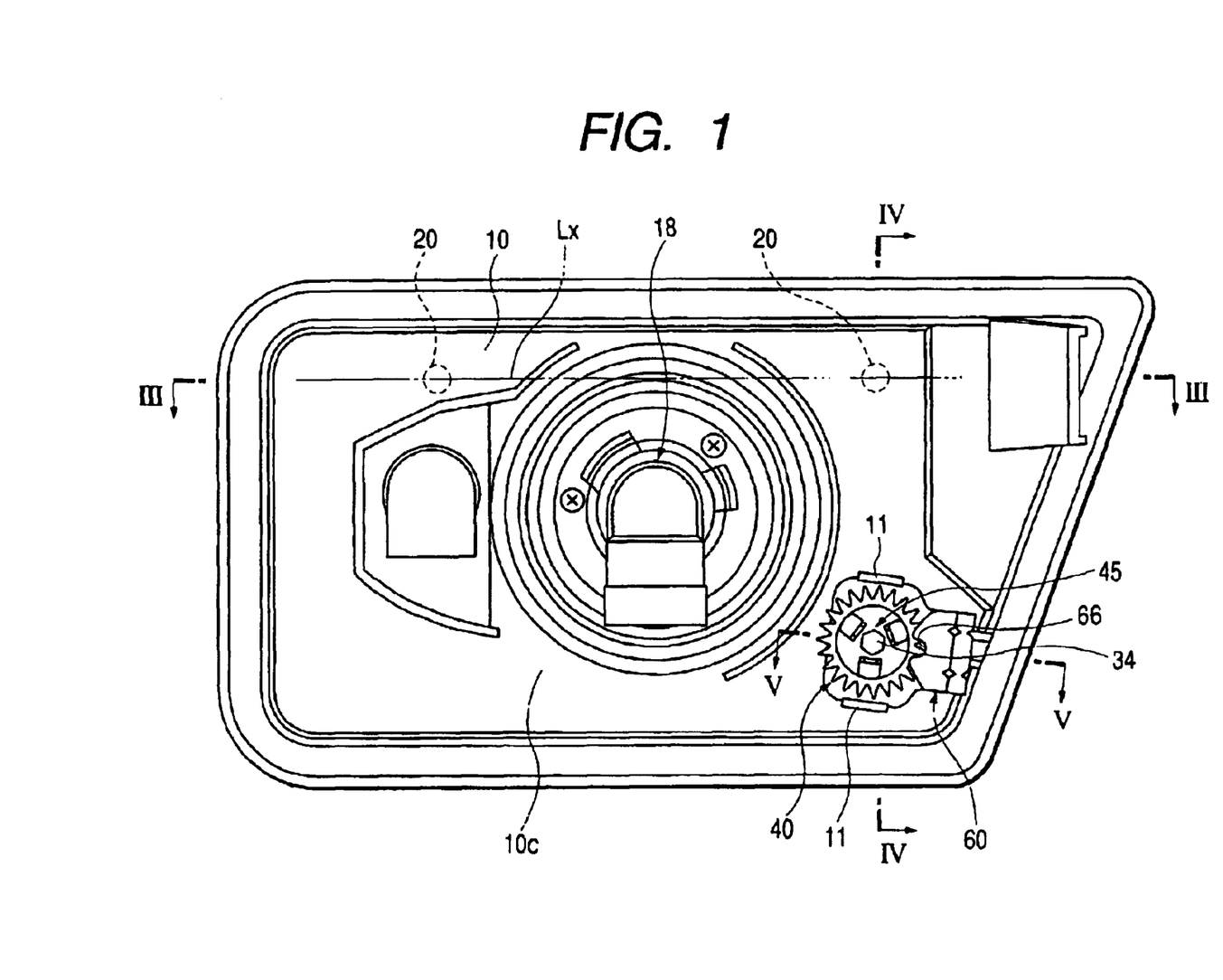
FIG. 1 is a rear view of a fog lamp for an automobile according to a first embodiment of the invention.
Figure 2:
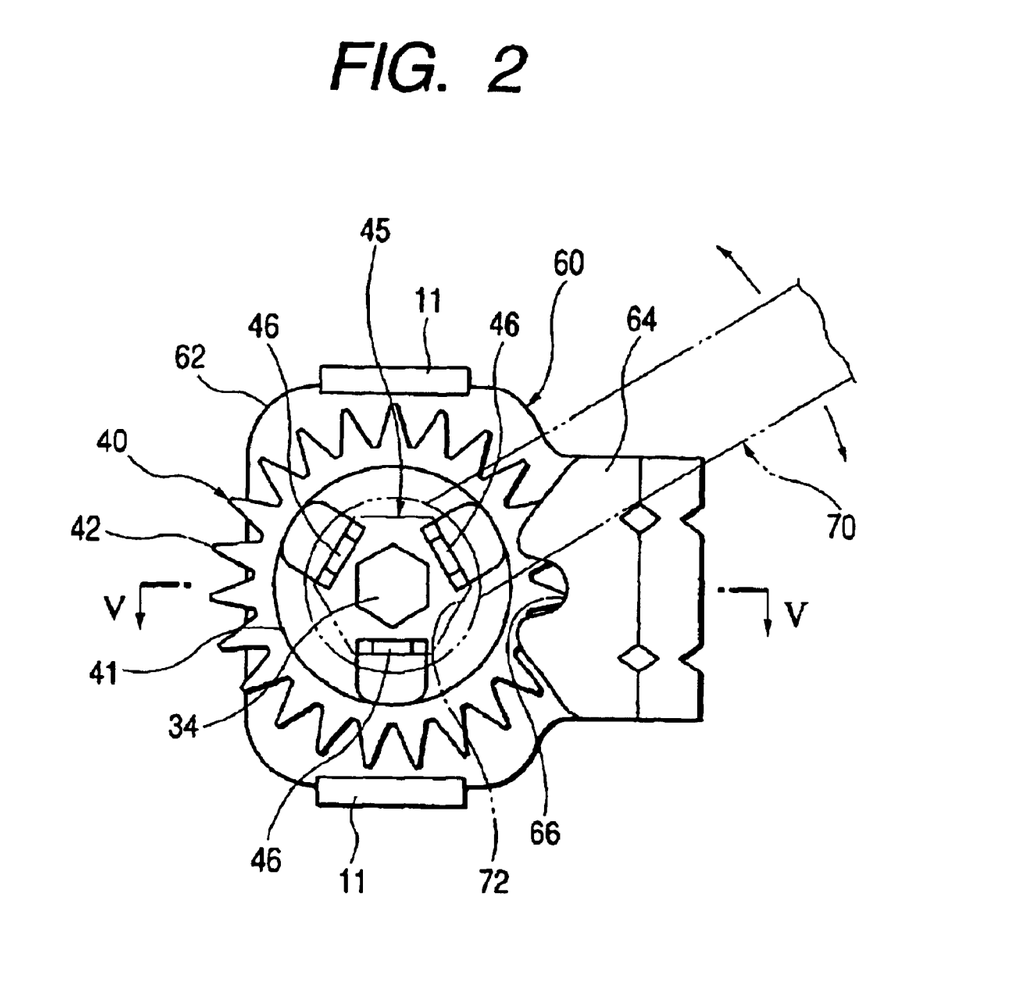
FIG. 2 is an enlarged rear view of a portion of the lamp of FIG. 1.
Figure 3:
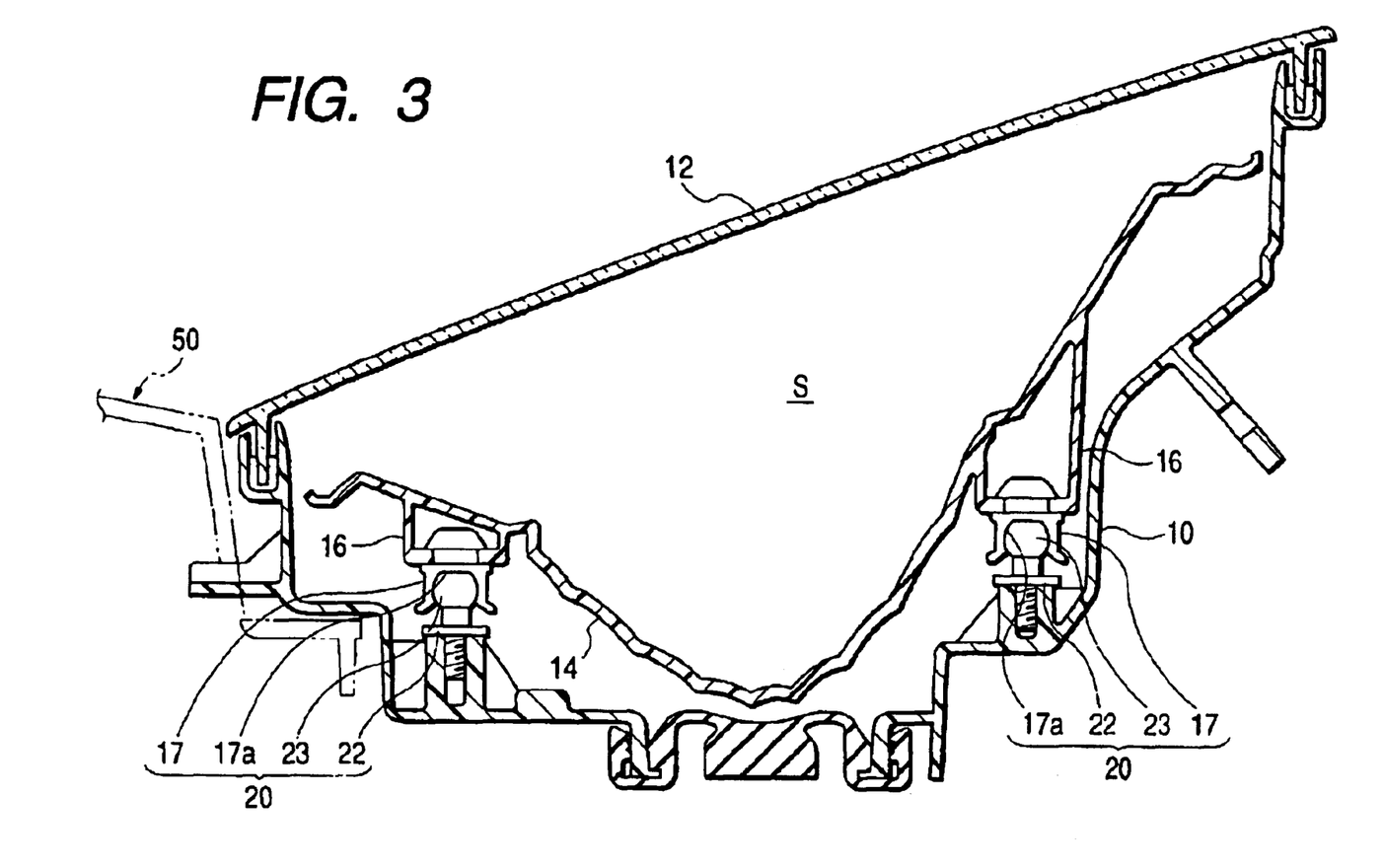
FIG. 3 is a horizontal sectional view (sectional view taken along a line III—III shown in FIG. 1) of the lamp.
Figure 4:
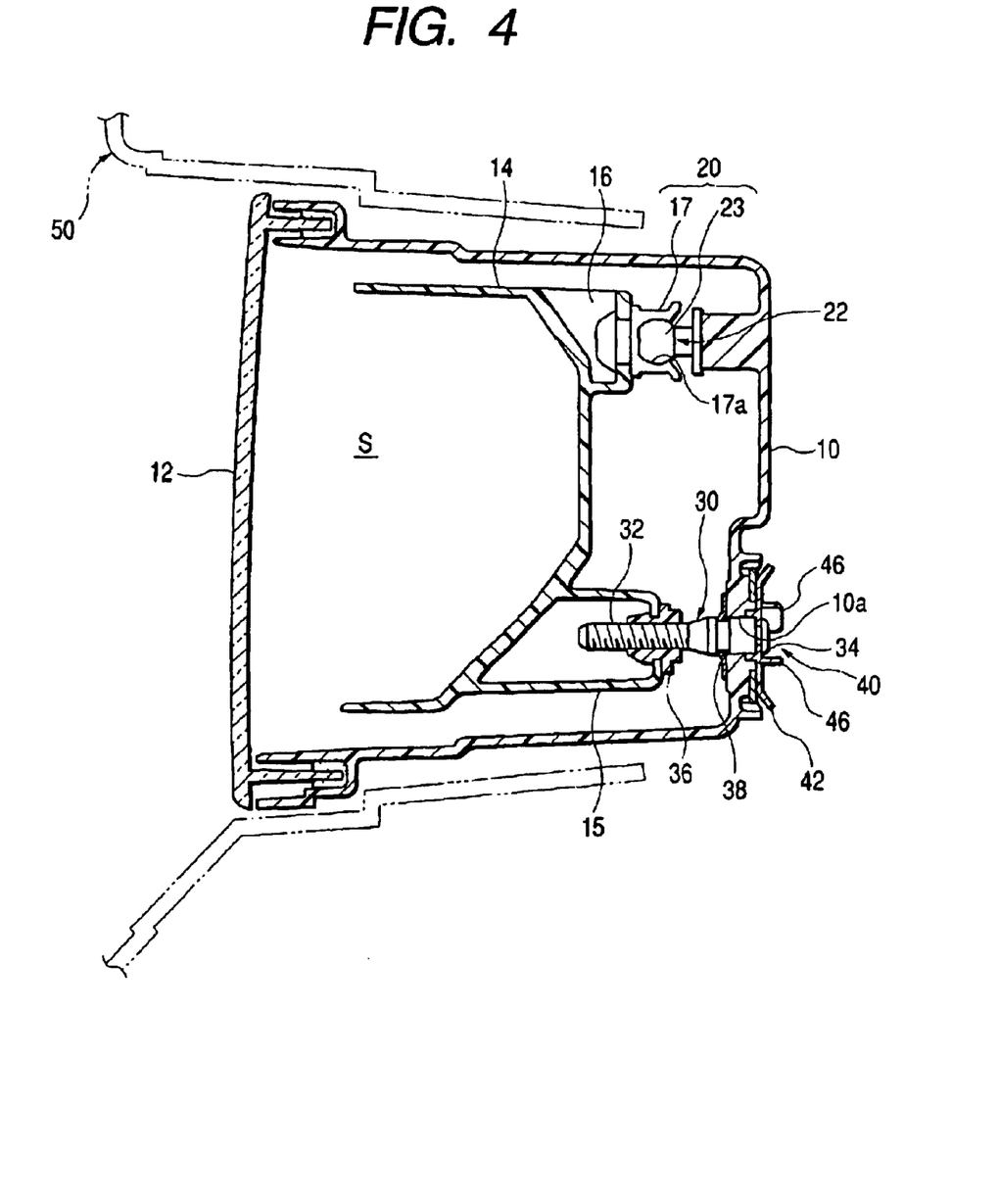
FIG. 4 is a vertical sectional view (sectional view taken along a line IV—IV shown in FIG. 1) of the lamp.
Figure 5:
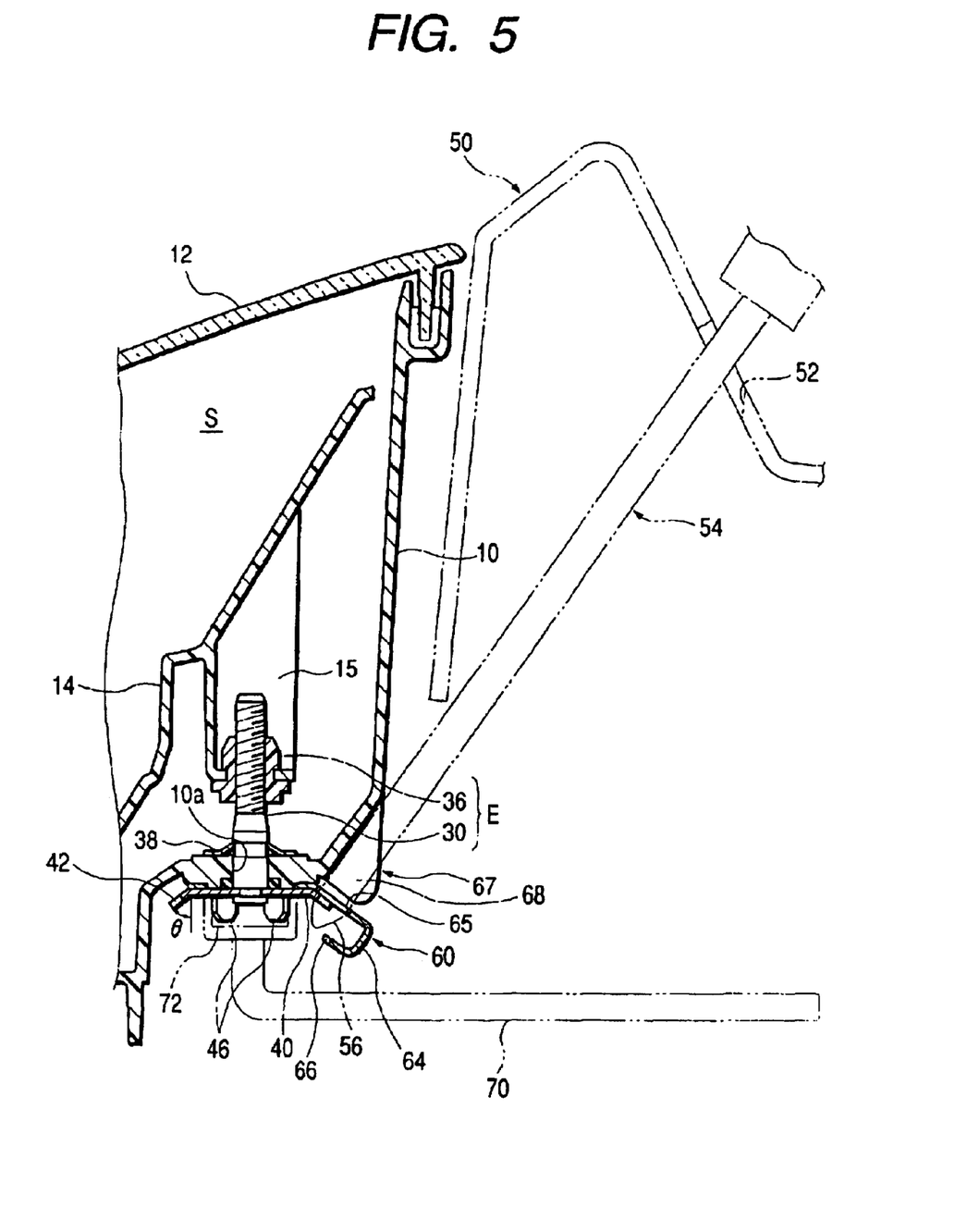
FIG. 5 is a horizontal sectional view (sectional view taken along a line V—V shown in FIGS. 1 and 2) of an aiming screw rotation supporting portion of an aiming mechanism.
Figure 6:
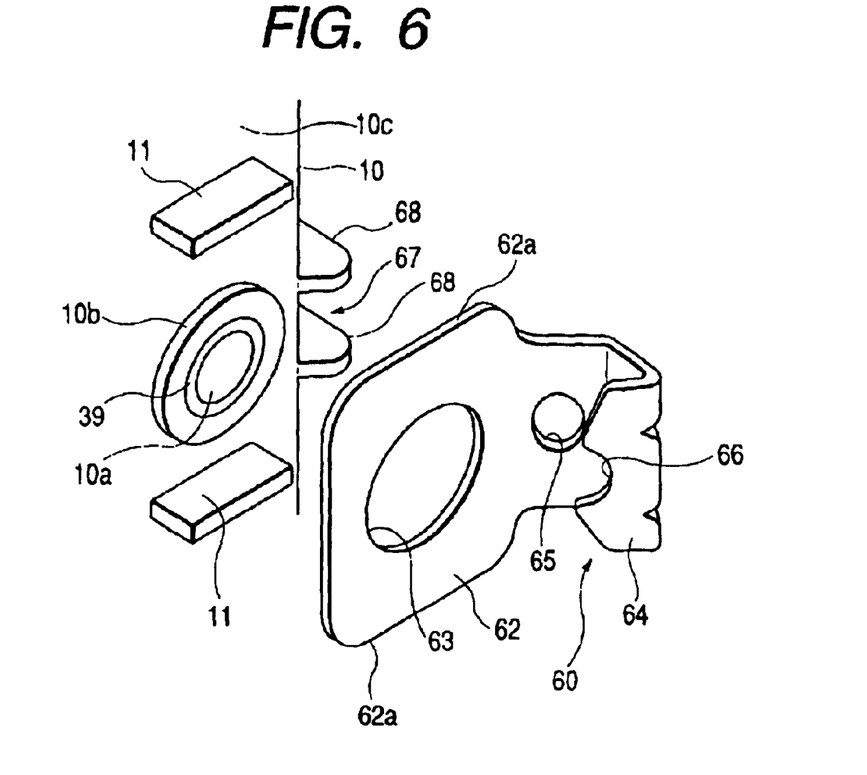
FIG. 6 is an exploded perspective view showing a structure of a first driver guide.
Figure 7:
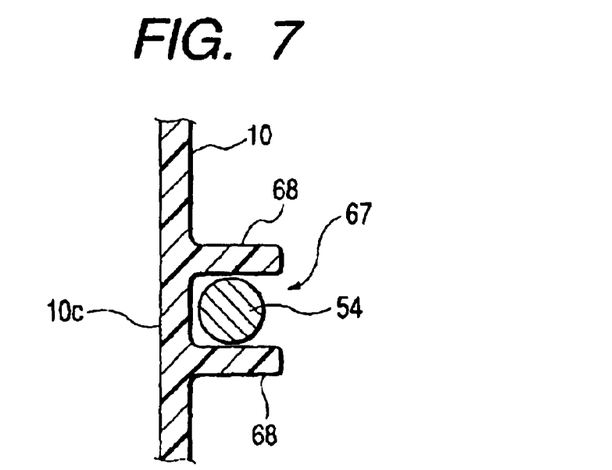
FIG. 7 is a sectional view of a second driver guide.

FIG. 1 through FIG. 7 show an embodiment of the invention. FIG. 1 is a rear view of a fog lamp for an automobile according to a first embodiment of the invention. FIG. 2 is an enlarged rear view of an essential portion of the lamp. FIG. 3 is a horizontal sectional view (sectional view taken along a line (III—III shown in FIG. 1) of the lamp. FIG. 4 is a vertical sectional view (sectional view taken along a line IV—IV shown in FIG. 1) of the lamp. FIG. 5 is a horizontal sectional view (sectional view taken along a line V—V shown in FIGS. 1 and 2) of an aiming screw rotation supporting portion of an aiming mechanism. FIG. 6 is an exploded perspective view showing a structure of attaching a first driver guide, and FIG. 7 is a sectional view of a second driver guide.

In these drawings, a vessel-like lamp body 10 made of synthetic resin in a fog is lamp is arranged to be contained in a predetermined recessed portion of a front bumper 50 (refer to FIGS. 3, 4, 5), and an opening portion of a front face of the lamp body 10 is integrated with a front face lens 12 to partition a lamp chamber S. A reflector 14 inside of the lamp chamber S includes an integrally mounted bulb 18 (refer to FIG. 1) constituting a light source that is inclinable by an aiming mechanism E.

The aiming mechanism E includes a pair of left and right ball joints 20, 20, an aiming screw 30 and a nut member 36. The pair of left and right ball joints 20, 20 is interposed between upper positions of the lamp body 10 and the reflector 14 and constituting fixed inclination fulcrums. Referring to FIG. 4, the aiming screw 30 rotatably supported by a screw inserting hole 10a is provided at a lower position of a rear face wall of the lamp body 10. The nut member 36 attached to a bracket 15 projects from a lower portion on the rear side of the reflector 14, and constitutes a movable inclination fulcrum by being screwed to a screw portion 32 of the aiming screw 30. Nut members 17, 17 attached to a pair of left and right brackets 16, 16 project from a rear face of the reflector 14, and a ball portion 23 of a ball member 22 is attached to an inner side of the lamp body 10, and is supported by a ball receiving portion 17a of the nut member 17 to thereby constitute a ball joint 20.

When the aiming screw 30 is rotated, the nut member 36 is extracted and retracted along the screw portion 32 of the aiming screw, and the reflector 14 is inclined around a horizontal inclination axis Lx (see FIG. 1) connecting the pair of left and right ball joints 20, 20. The aiming screw 30 is therefore an up and down aiming screw for adjusting the angle of inclination of the optical axis of the lamp around the inclination axis Lx.

A rear end portion 34 of the aiming screw 30 penetrating the screw inserting is hole 10a, is integrated with a crown gear 40 made of a metal by caulking. The crown gear 40 is arranged proximate to the rear face side of the lamp body 10. A push-on fixture brings the crown gear 40 into pressure contact with a rear face wall of the lamp body to prevent detachment of the aiming screw. In addition, a teeth portion 42 of the crown gear 40 is inclined to a disk portion 41 by an angle θ (which may equal 45 degrees), and as shown by imaginary lines of FIG. 5, a tooth tip 56 of a driver 54 inserted through an opening portion 52 of the front bumper 50, is brought in mesh with the teeth portion 42 of the crown gear 40.

A first driver guide 60 functions to hold the driver 54 in a position to bring the tooth tip 56 of the driver 54 to mesh with the teeth portion 42 of the crown gear 40. The first driver guide 60 may be constituted by a formed sheet metal member by forming a metal sheet into a predetermined shape by punching or bending, and is constituted by a flat rectangular plate portion 62 capable of being brought into close contact with the rear face wall of the lamp body and an extended portion 64 having a section in a channel-like shape covering a portion of the teeth portion 42 of the crown gear 40 as shown by FIG. 2 and FIG. 6.

The plate portion 62 is provided with a circular hole 63 engageable to a ring-like peripheral edge portion 10b of a bulb inserting hole. When the circular hole 63 is engaged with the peripheral edge portion 10b of the bulb inserting hole, by sandwiching side edges 62a, 62a opposed to each other of the plate portion 62 by a pair of locking pieces 11, 11 in a shape of an erected wall projected from the rear face wall of the lamp body, the first driver guide 60 is prevented from pivoting in a peripheral direction. O ring 39 is used to waterproof the bulb inserting hole 10a.

At a position proximate to a portion of the extended portion 64 extending from the plate portion 62, there is provided a circular hole 65. The hole 65 contacts an outer peripheral face in the vicinity of the tooth tip 56 of the driver 54 and holds the tooth tip 56 of the driver 54 to mesh with the teeth portion 42 of the crown gear 40. The size of the circular hole 65 is slightly larger than an outer diameter of the driver 54 such that the teeth tip 56 of the driver 54 in mesh with the teeth portion 42 of the crown gear 40 can be restrained from swinging and rotational movement of the driver 54 is permitted.

A circular notch 66 is also provided at a front end of an eaves portion of the extended portion 64 covering the teeth portion 42 of the crown gear 40. The notch 66 corresponds with the circular hole 65, and the notch 66 functions as a stopper for regulating the amount of insertion of the driver 54 and to confirm contact of the tooth tip 56 of the driver 54 and the teeth portion 42 of the crown gear 40 in mesh with each other via the notch 66. That is, the inner diameter of the notch 66 is formed to be more or less smaller than an outer diameter of the driver 54, and when the driver 54 is pushed more than necessary, a front end portion of the driver 54 is brought into contact with a peripheral edge portion of the notch 66 to thereby make further insertion difficult. Further, the operator can confirm that the tooth tip 56 of the driver 54, inserted from the opening portion 52 of the front bumper 50 in the skewed rearward direction, and the teeth portion 42 of the crown gear 40 have meshed with each other by viewing their contact state via the notch 66 from an upper side of the front body of an automobile to the rear face side of the lamp.

Further, as shown by FIGS. 5 through 7, at a position of the rear face wall of the lamp body proximate to the circular hole 65 of the first driver guide 60, there are provided a pair of upper and lower parallel extended portions 68, 68 in a plate-like shape, and there is provided a second driver guide 67 having a section in a channel-like shape constituted by a rear face wall 10c of the lamp body and the pair of upper and lower extended portions 68, 68 in a plate-like shape. The second driver guide 67 guides the tooth tip 56 of the inserted driver 54 and leads the tooth tip 56 in a direction of being brought in mesh with the teeth portion 42 of the crown gear, and restrains displacement of the driver 54 in an up and down direction and in a left and right direction. The second driver guider permits rotation of the driver 54 in cooperation with the circular hole 65 of the first driver guide 60 to thereby realize pivotal movement in a proper state of bringing the tooth tip 56 of the driver 54 in mesh with the teeth portion 42 of the crown gear 40.

That is, the second driver guide 67 restrains the displacement of the driver 54 in the up and down direction and the right direction (a direction in view from a direction of inserting the driver). The circular hole 65 of the first driver guide 60 restrains the displacement of the driver 54 in the left direction (left direction in view from the direction of inserting the driver). In the case of bringing the tooth tip 56 of the driver 54 in mesh with the teeth portion 42 of the crown gear 40 and pivoting the teeth portion 42, when the driver 54 is operated to rotate in a state of engaging a side face of the driver 54 with the second driver guide 67, meshing between the tooth tip 56 of the driver 54 and teeth portion 42 of the crown gear 40 is not disengaged and therefore, the optical axis of the lamp can firmly be adjusted by a small amount.

Further, the disk face of the crown gear 40 is provided with a raised wrench engaging portion 45 engagement with an L-shaped wrench. The wrench engaging portion 45 is constituted by three pieces of erected walls 46 in a shape of a tongue piece at equal intervals in a peripheral direction produced by making cuts in a U-like shape at three locations at equal intervals in the peripheral direction of the disk portion 41 of the crown gear 40, and folding and vertically raising areas surrounded by the cuts to the center side of the gear 40. The erected walls 46 in the shape of the tongue piece constituting the wrench engaging portion 45 are constituted to be brought in mesh with three faces of an inner periphery of a hexagonal engaging hole 72 at a front end portion of an L-shaped wrench 70 at equal intervals and by engaging the hexagonal engaging hole 72 of the L-shaped wrench 70 to an outer side of the wrench engaging portion 45 (the erected walls 46) and turning the L-shaped wrench 70 in the direction of the arrow of FIG. 2. The gear 40 (aiming screw 30) can thus firmly be pivoted by a large amount.

According to the above-described embodiment, there is constructed a constitution in which the teeth portion 42 of the crown gear 40 is inclined to the disk face by 45 degrees and the optical axis of the lamp can be adjusted by inserting the driver from a skewed front direction of 45 degrees on a side of the lamp. There also can be constructed a constitution in which the optical axis can be adjusted from an arbitrary direction by using the driver 54 by setting the inclination angle θ relative to the disk face of the teeth portion 42 of the crown gear 40 by a predetermined angle related to the direction of insertion of the driver, and the driver can be inserted at the rear face side of the lamp body.

Further, although the wrench engaging portion 45 is formed at the crown gear 40 fixedly integrated to the rear end portion 34 of the aiming screw, the gear formed with the wrench engaging portion is not limited to the crown gear 40 but may be a gear in a shape of a circular disk made of a metal such as a spur gear.

As is apparent from the above-described explanation, the aiming screw can be operated to pivot by a large amount by using the L-shaped wrench extended in the direction along the rear face of the lamp piece. Therefore, the optical axis can be adjusted even when there is no space to insert the driver on the rear side of the lamp piece.

The wrench engaging portion can be formed simply, for example, by cutting raised areas in the tongue-like shape of the disk portion of the gear. Therefore, conventional difficulties of fabricating the rear end portion of the aiming screw can be resolved.

Further, in the disk portion, the gear is light-weight by an amount of the opening portion in correspondence with the wrench engaging portion. Therefore, the aiming screw is light-weight by that amount to facilitate the pivotal movement operation of the aiming screw.

In an embodiment, meshing between the wrench engaging portion and the hexagonal engaging hole of the wrench is ensured, and the aiming screw can firmly be pivoted by a large amount. Therefore, the optical axis can firmly be inclined by a large amount.

Further, the constitution of the wrench engaging portion is concise and easy to form.

There can also be constructed a constitution in which the aiming screw can be operated to pivot by using the driver arranged from an arbitrary direction. Therefore, the direction of arranging the driver can freely be laid out in correspondence with a space of the vehicle body around the lamp piece, to minimize restrictions in arranging the lamp piece.

Further, meshing between the tooth tip of the driver and the teeth portion of the crown gear is ensured and the aiming screw can firmly be pivoted by a small amount and therefore, the optical axis can firmly be inclined by a small amount.

Rotational operation of the aiming screw by the driver becomes smooth, and therefore, adjustment of the optical axis is facilitated by that amount.

What is claimed is:

1. A vehicle lamp comprising:
   a lamp chamber partitioned by a lamp body in a vessel-like shape and a front face lens;
   a reflector attachedly inserted with a light source and contained in the lamp chamber, and
   an aiming mechanism interposed between the lamp body and the reflector for inclinably supporting the reflector to the lamp body;
   wherein the reflector is inclined by rotating an aiming screw supported by a screw inserting hole provided at the lamp body; and
   wherein an end portion of the aiming screw projecting from a rear side of the lamp body includes an integrated circular gear proximate to the lamp body and a disk face of the gear is provided with a raised wrench engaging portion for engaging with an L-shaped wrench, wherein the wrench engaging portion comprises raised walls in a shave of a tongue piece from a central portion of the gear.

2. The vehicle lamp according to claim 1 wherein the wrench engaging portion comprises three raised walls in a shape of a tongue piece at equal intervals in a peripheral direction from a central portion of the gear for meshing with three faces of an inner periphery at equal intervals of a hexagonal engaging hole of the wrench.

3. The vehicle lamp according to claim 1 wherein the gear comprises a crown gear having a teeth portion that is inclined to a disk face thereof by a predetermined angle, and the lamp body is provided with a first driver guide for guiding a driver to bring a tooth tip of the driver to mesh with the teeth portion of the crown gear.

4. The vehicle lamp according to claim 2 wherein the gear comprises a crown gear having a teeth portion that is inclined to a disk face thereof by a predetermined angle, and the lamp body is provided with a first driver guide for guiding a driver to bring a tooth tip of the driver to mesh with the teeth portion of the crown gear.

5. The vehicle lamp according to claim 3 wherein the lamp body comprises a second driver guide for leading the tooth tip of the driver in a direction to mesh with the teeth portion of the crown gear.

6. The vehicle lamp according to claim 4 wherein the lamp body comprises a second driver guide for leading the tooth tip of the driver in a direction to mesh with the teeth portion of the crown gear.

7. An aiming mechanism for a vehicle lamp comprising:
   a component having a ball joint rotatably attached to a reflector of the lamp, for permitting the reflector to pivot about a pivot axis; and
   an adjustable aiming mechanism connected to the reflector and operable to cause the reflector to pivot about the pivot axis, wherein the aiming mechanism includes a bracket connected to a lamp body and an aiming screw, the aiming screw having an integrated circular gear with teeth and a disk face having raised wrench engaging portions, wherein the wrench engaging portions comprise raised walls in a shape of a tongue piece from a central portion of the gear.

8. The apparatus of claim 7 wherein the raised wrench engaging portions are formed at equal intervals about a central portion of the disk face.

9. The apparatus of claim 7 wherein the circular gear includes angled teeth inclined at a predetermined angle to the disk face.

10. The apparatus of claim 7 wherein the bracket includes a first driver guide to guide a driver to contact the teeth.

11. The apparatus of claim 9 wherein the bracket includes a second driver guide to guide a driver to mesh with the angled teeth.

* * * * *